E. Smith.
Potato-Digger.

N° 74438. Patented Feb. 11, 1868.

Witnesses
Geo. A. Walker

Inventor
Ezekiel Smith

United States Patent Office.

EZEKIEL SMITH, OF WEST MILTON, NEW YORK.

Letters Patent No. 74,498, dated February 11, 1868.

---

IMPROVEMENT IN POTATO-DIGGERS.

---

*The Schedule referred to in these Letters Patent and making part of the same.*

---

TO ALL WHOM IT MAY CONCERN:

Be it known that I, EZEKIEL SMITH, of West Milton, in the county of Saratoga, and State of New York, have invented, made, and applied to use a certain new and useful Improvement in Potato-Diggers; and I do hereby declare the following to be a full, clear, and exact description of the same, reference being had to the annexed drawing, making part of this specification, wherein—

Similar marks of reference denote the same parts.

Figure 2:
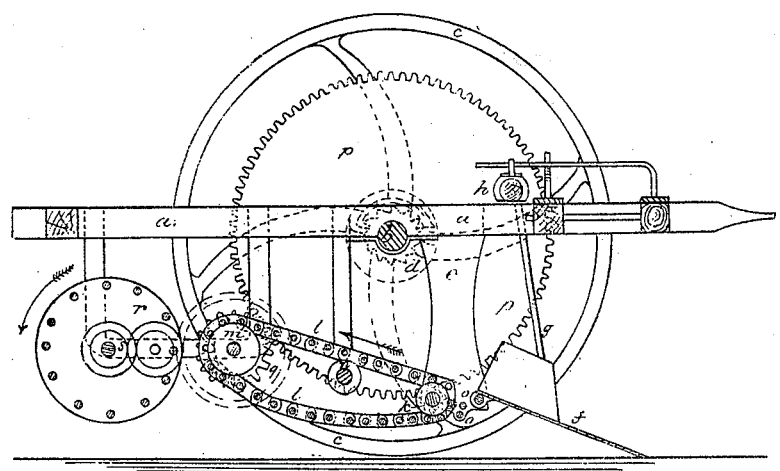
Figure 2 is a longitudinal section of the same.
Figure 1:
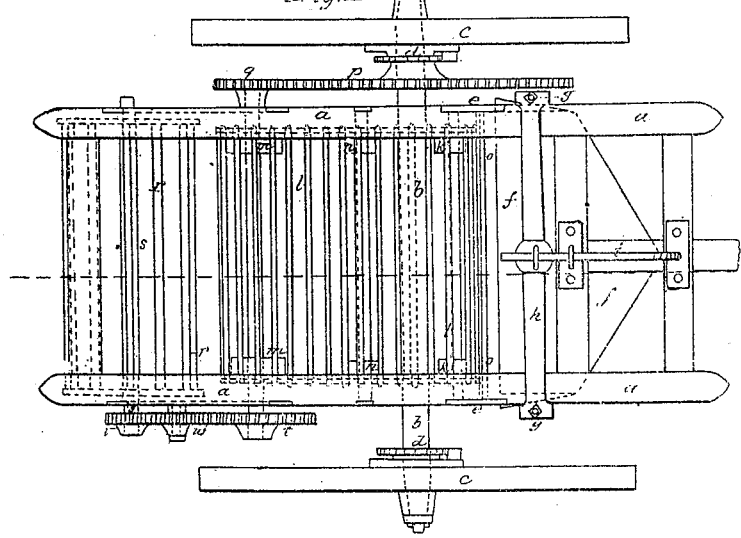
Figure 1 is a plan of the said machine.

My invention consists in the combination of a revolving riddle and separator with an endless elevating-platform and an excavating-scoop. By this combination of devices the earth and potatoes are first raised and passed back upon the elevating-platform, which, being made of slats, allows the earth and small stones to sift away from the potatoes, and then the revolving riddle throws the potatoes over upon the surface of the earth, the soil being entirely separated from them.

In the drawing, $a$ represents a frame, supported by the axle $b$ of the wheel $c$, ratchet-wheels being applied at $d$ on the axle $b$, taking spring-clicks upon the wheels, whereby the axle is rotated when the machine is being driven forward, and provision is made for the relative speed of the wheels when turning. Below the frame $a$ the hanging plates or frames $e$ sustain the back edge of the share or scoop $f$, and $g\,g$ are links to the cross-bar $h$ and its lever $i$, by which the outer end of said scoop can be kept up from contact with the earth in going to or from the field, or in turning the head-land. Directly in rear of the scoop $f$ is a skeleton roller, $k$, around which passes the endless platform $l$, of bars or slats, united by links at their ends, and $m$ is the upper roller, around which this platform passes. $n\,n$ are supporting rollers for the platform $l$, and bars at $o\,o$ may be introduced to protect the front end of the platform from injury by contact with the earth or with stones. This platform, $l$, is propelled in the direction of the arrow by the wheel $p$ on the axle $b$ taking the pinion $q$, and the tubers are passed by this platform up from the scoop $f$, and the dirt partially sifted therefrom in passing up on the said platform $l$. $r$ is a revolving riddle, formed of slats or bars, between heads on a shaft, $s$, that is driven by the gears $t, u, v$, from the axle of the roller $m$, or by any other suitable gearing, to propel the same in the direction of the arrow.

It will now be understood that, as the earth and potatoes are delivered from the endless platform of slats, they fall against the riddle $r$, that throws the potatoes over itself and out behind the machine, while the earth sifts through the riddle; hence the potatoes are upon the surface, and there is no chance for the earth and potatoes to fall in a lump together upon the surface, neither can the potatoes be covered by the earth. A second revolving riddle, like the riddle $r$, may be placed at the rear of the machine, and revolved by suitable gearing. This second riddle will only be required when the earth is very tenacious or wet.

What I claim, and desire to secure by Letters Patent, is—

The revolving riddle $r$, in combination with the endless platform $l$ and scoop $f$, the whole constructed and operating as and for the purposes specified.

In witness whereof, I have hereunto set my signature, this twenty-seventh day of November, 1867.

EZEKIEL SMITH.

Witnesses:
SETH WHALEN,
DAVID MAXWELL.